United States Patent
Cudak et al.

(10) Patent No.: US 9,807,122 B2
(45) Date of Patent: Oct. 31, 2017

(54) SECURITY CONSIDERATIONS FOR OUTGOING COMMUNICATIONS

(71) Applicant: Lenovo Enterprise Solutions (Singapore) Pte. Ltd., Singapore (SG)

(72) Inventors: Gary D. Cudak, Wake Forest, NC (US); Joseph F. Herman, Raleigh, NC (US); J. Mark Weber, Wake Forest, NC (US); Christine Marie Stamm-Nettleship, Wake Forest, NC (US); Zendre Necole Simmons, Durham, NC (US)

(73) Assignee: Lenovo Enterprise Solutions (Singpore) Pte. Ltd., Singapore (SG)

( * ) Notice: Subject to any disclaimer, the term of this patent is extended or adjusted under 35 U.S.C. 154(b) by 63 days.

(21) Appl. No.: 14/855,581

(22) Filed: Sep. 16, 2015

(65) Prior Publication Data

US 2017/0078291 A1     Mar. 16, 2017

(51) Int. Cl.
*H04L 29/00* (2006.01)
*H04L 29/06* (2006.01)

(52) U.S. Cl.
CPC .................. *H04L 63/205* (2013.01)

(58) Field of Classification Search
CPC ..... H04L 63/10; H04L 63/102; H04L 63/105; H04L 41/5041; H04L 41/0806; H04L 63/205
See application file for complete search history.

(56) References Cited

U.S. PATENT DOCUMENTS

| | | | |
|---|---|---|---|
| 2004/0148500 A1* | 7/2004 | Olkin | H04L 12/5875 713/150 |
| 2005/0138353 A1* | 6/2005 | Spies | H04L 63/0442 713/153 |
| 2005/0182957 A1* | 8/2005 | Della-Libera | G06F 21/606 726/22 |
| 2009/0055477 A1* | 2/2009 | Flesher | G06F 17/30165 709/204 |
| 2013/0041958 A1* | 2/2013 | Post | G06Q 10/103 709/206 |
| 2013/0067566 A1* | 3/2013 | Oh | G06F 3/0346 726/19 |
| 2013/0167250 A1* | 6/2013 | Balasubramanian | G06F 21/10 726/28 |
| 2014/0169213 A1* | 6/2014 | Rickman | H04L 41/5041 370/254 |
| 2015/0052342 A1* | 2/2015 | Jang | G06F 21/575 713/2 |
| 2016/0210452 A1* | 7/2016 | Pahud | G06F 21/32 |

* cited by examiner

*Primary Examiner* — Don Zhao
(74) *Attorney, Agent, or Firm* — Jeffrey L. Streets (57) ABSTRACT

A method includes determining a topic and a media type of a communication to be sent from a sending communication device to a designated receiving communication device, assigning one or more security requirements to the communication based on the topic and the media type, identifying a security state of the receiving communication device for receiving the communication via the media type, and transmitting the communication from the sending communication device to the receiving communication device only in response to the security state of the receiving communication device satisfying the one or more security requirements.

20 Claims, 6 Drawing Sheets

| Topic | Media Type | Security Requirements ||||
| | | Person/Device Present (Distance) | Speaker Allowed | Font Restriction | Volume Restriction |
| --- | --- | --- | --- | --- | --- |
| Business (M&A) | Text | Y (15ft) | | Y | |
| | Call | Y (10ft) | N | | Y |
| | Audio/Vis. | N | N | | Y |
| Business (Schedule) | Text | Y | Y | N | |
| | Call | Y | Y | | Y |
| | Audio/Vis. | Y | Y | | Y |
| Personal (Medical) | Text | Y (3ft) | N | Y | |
| | Call | Y | N | | Y |
| | Audio/Vis. | Y (6ft) | N | | Y |
| Personal (Weekend Plans) | Text | Y | Y | N | |
| | Call | Y | Y | | N |
| | Audio/Vis. | Y | Y | | N |

SECURITY CONSIDERATIONS FOR OUTGOING COMMUNICATIONS

BACKGROUND

Field of the Invention

The present invention relates to communications between communication devices, such as mobile phones and tablet computers.

Background of the Related Art

The use of computers of various types has become pervasive. There are computers at work, home, and public places. In particular, mobile handheld communication devices, such as phones and tablets, can be easily carried and used in even the most unlikely places. Accordingly, people are using communication devices to hold conversations, exchange text messages, send and receive email, and hold video conferences anywhere and everywhere. However, the subject matter of these communications may be private or confidential and should not be shared or allowed to be seen by unintended third parties, such as bystanders in a crowded restaurant or auditorium. Still another person may wander by and momentarily overhear or see something that was intended to be private.

BRIEF SUMMARY

One embodiment of the present invention provides a method, comprising determining a topic and a media type of a communication to be sent from a sending communication device to a designated receiving communication device, assigning one or more security requirements to the communication based on the topic and the media type, identifying a security state of the receiving communication device for receiving the communication via the media type, and transmitting the communication from the sending communication device to the receiving communication device only in response to the security state of the receiving communication device satisfying the one or more security requirements.

Another embodiment of the present invention provides a method, comprising determining a topic and a media type of a communication to be sent from a sending communication device to a designated receiving communication device, assigning one or more security requirements to the communication based on the topic and the media type, identifying a security state of the receiving communication device for receiving the communication via the media type, and producing an output notification to the sending communication device in response to determining that the receiving communication device has not satisfied one or more of the security requirements.

DETAILED DESCRIPTION

One embodiment of the present invention provides a method, comprising determining a topic and a media type of a communication to be sent from a sending communication device to a designated receiving communication device, assigning one or more security requirements to the communication based on the topic and the media type, identifying a security state of the receiving communication device for receiving the communication via the media type, and transmitting the communication from the sending communication device to the receiving communication device only in response to the security state of the receiving communication device satisfying the one or more security requirements.

A topic determination may be made in any known manner. The simplest manner of topic determination is for a user to enter the topic through a user interface, such as by typing or selecting from a menu of predetermined topics. A preferred manner of topic determination includes key word recognition, either in text form or voice form. Accordingly, a software program may monitor the communication, such as a text message or recorded voice message, and automatically determine the topic based on key words within the communication.

The media type of a communication, such as a voice message, a text message, or an audiovisual message, can be identified either by the nature of the application being used for the communication or analyzing the content of the communication. For example, an email application on a computer or a text app on a mobile communication device is used to prepare and send messages as text. A separate voice-over-internet-protocol (VOIP) application or feature, or a phone app, is used to prepare and send a voice message. Accordingly, the application that originates the communication may indicate, perhaps in a header, the media type of the communication to be sent. Alternatively, differences in the format or content of the communication may indicate the media type.

The communication may be sent in any manner over any medium. For example, the communication may sent over a communication network such as a cellular network, a local area network or wide area network, such as the Internet. Alternatively, the communication may be sent between devices via a near-field communication signal.

The communication devices themselves may be any processor-based device that is capable of executing the present methods. Specific non-limiting examples of a sending or receiving communication device includes a mobile communication device such as a smartphone; a computer such as a server, personal computer, notebook, laptop or tablet; or an integrated computer system such as a user-interface of an automobile. Preferably, the communication devices will have one or more input devices for detecting environmental conditions near the communication device. Such input devices may include, without limitation, a microphone, a camera, near field communication antenna, and combinations thereof. The communication device will preferably also include multiple output devices, such as a display screen, a headphone jack, or a speaker. A user interface to the communication device may further include, without limitation, a virtual or physical keyboard, a touchscreen, mouse, or trackpad.

One or more security requirements may be assigned to the communication in various ways, including manually entering one or more security requirements into the sending communication device. Accordingly, the user of the sending communication device has full control over the security requirements. Alternatively, one or more security requirements may be assigned to the communication by searching predetermined associations of various communication topics and media types with security requirements, and automatically assigning one or more security requirements having a predetermined association with the topic and media type of the communication. Such predetermined associations may be standardized across an organization or established on an individual basis. Optionally, the predetermined associations may include a history of manually entered associations between various communication topics and security requirements. In one optional embodiment, the method may further include monitoring a sequence of messages within the communication, determining the topic of each message, and assigning one or more new security requirements in response to a change in the topic of the communication. Non-limiting examples of security requirements include whether a person or device may be present, at what distance may a person or device be present, whether a speaker may be used, whether fonts are restricted, whether volume is restricted, whether notifications are allowed, and whether a privacy filter is required.

In another embodiment of the method, identifying a security state of the receiving communication device may include the receiving communication device sending security state data to the sending communication device, wherein the security state data includes audiovisual output settings. For example, the audiovisual output settings may be selected from audio volume, active audio output device, text font size, screen size, and combinations thereof.

In yet another embodiment of the method, identifying a security state of the receiving communication device may include the receiving device detecting one or more environmental conditions using an input device. Such an input device may, without limitation, be selected from a microphone, camera, near field communication antenna, and combinations thereof. The method may further comprise using the detected one or more environmental conditions to determine a distance from the receiving communication device to a person or an electronic device that is not involved in the communication. Examples of an electronic device of concern may include, without limitation, another communication device, a camera, or an audio recording device. Where there are multiple people or electronic devices present, the method preferably determines the distance to the nearest person or electronic device. The method may further comprise determining whether the distance from the receiving communication device to the person or electronic device is less than a predetermined distance threshold associated with the current audiovisual output settings of the receiving communication device. For example, the audiovisual output settings may be selected from audio volume, active audio output device (i.e., headphones or speakerphone), text font size, screen size, and combinations thereof.

In one option, the method may further include the sending communication device requesting that the receiving communication device accept security requirements specified by the second communication device. Accordingly, the sending communication device may send the security requirements to the receiving communication device, and the receiving communication device may implement the security requirements.

In another option, the method may further include the sending communication device requesting that the receiving communication device share security state data with the sending communication device. For example, the receiving communication device may provide audiovisual output settings selected from call volume, text font size, a security screen installed, a headpiece in use, a speakerphone in use, and combinations thereof. Accordingly, the sending communication device may only send the communication in response to the sending communication device determining that the security state data of the receiving communication device satisfies the security requirements of the sending communication device. In a further option, the sending communication device may periodically request that the receiving communication device send updated security state data to the sending communication device. Therefore, the sending communication device may take action if the security state of the receiving communication device no longer satisfies the security requirements in effect at that time. For example, the sending communication device may identify a media type for which the identified security state of the receiving communication device will satisfy the one or more security requirements, and then send the communication using the identified media type.

In yet another embodiment, the method may further include producing an output notification to the receiving communication device in response to the receiving communication device satisfying a security requirement. Conversely, the method may further include producing an output notification to the receiving communication device describing a security requirement that has not been satisfied or describing how to satisfy a security requirement that has not been satisfied. Such notifications may include, without limitation, a pop-up message on a display screen, a user interface color change, or an auditory warning, such as an audible tone.

In another embodiment, the method may further include producing an output notification to the sending communication device in response to determining that the receiving communication device has not satisfied one or more of the security requirements.

In a further embodiment, the method may further include the sending communication device delaying transmission of the communication until the receiving communication device has satisfied the security requirements. Alternatively, the method may further include the sending communication device converting the communication from a communication type for which the receiving communication does not satisfy the security requirements to a communication type for which the receiving communication device satisfies the security requirements. For example, a highly confidential topic may be associated with stricter security requirements for a call on a speakerphone than for a text message. Therefore, if the security state of the receiving communication device does satisfy the security requirements for communicating the topic via a telephone call, then perhaps the method may convert the message to a text message and send the text message while satisfying the security requirements for communicating the same topic as a text message. Various embodiments of the method may use either text to speech conversion or speech to text conversion.

Another embodiment of the present invention provides a method, comprising determining a topic and a media type of a communication to be sent from a sending communication device to a designated receiving communication device, assigning one or more security requirements to the communication based on the topic and the media type, identifying a security state of the receiving communication device for receiving the communication via the media type, and producing an output notification to the sending communication device in response to determining that the receiving communication device has not satisfied one or more of the security requirements. In this manner, a user can decide whether or not to transmit the communication or continue a series of messages from the sending communication device to the receiving communication device. This gives the user of the sending communication device the opportunity to assess the privacy or security risk associated with the communication and to persuade the user of the receiving communication device to take action in order satisfy the one or more security requirements.

Another embodiment of the present invention provides a computer program product comprising program instructions embodied on a non-transitory computer readable storage medium, the program instructions executable by a processor to cause the processor to perform a method. The method comprises determining a topic and a media type of a communication to be sent from a sending communication device to a designated receiving communication device, assigning one or more security requirements to the communication based on the topic and the media type, identifying a security state of the receiving communication device for receiving the communication via the media type, and transmitting the communication from the sending communication device to the receiving communication device only in response to the security state of the receiving communication device satisfying the one or more security requirements.

The foregoing computer program product may further include program instructions for implementing or initiating any one or more aspects of the methods described herein. Accordingly, a separate description of the methods will not be duplicated in the context of a computer program product.

Figure 1:
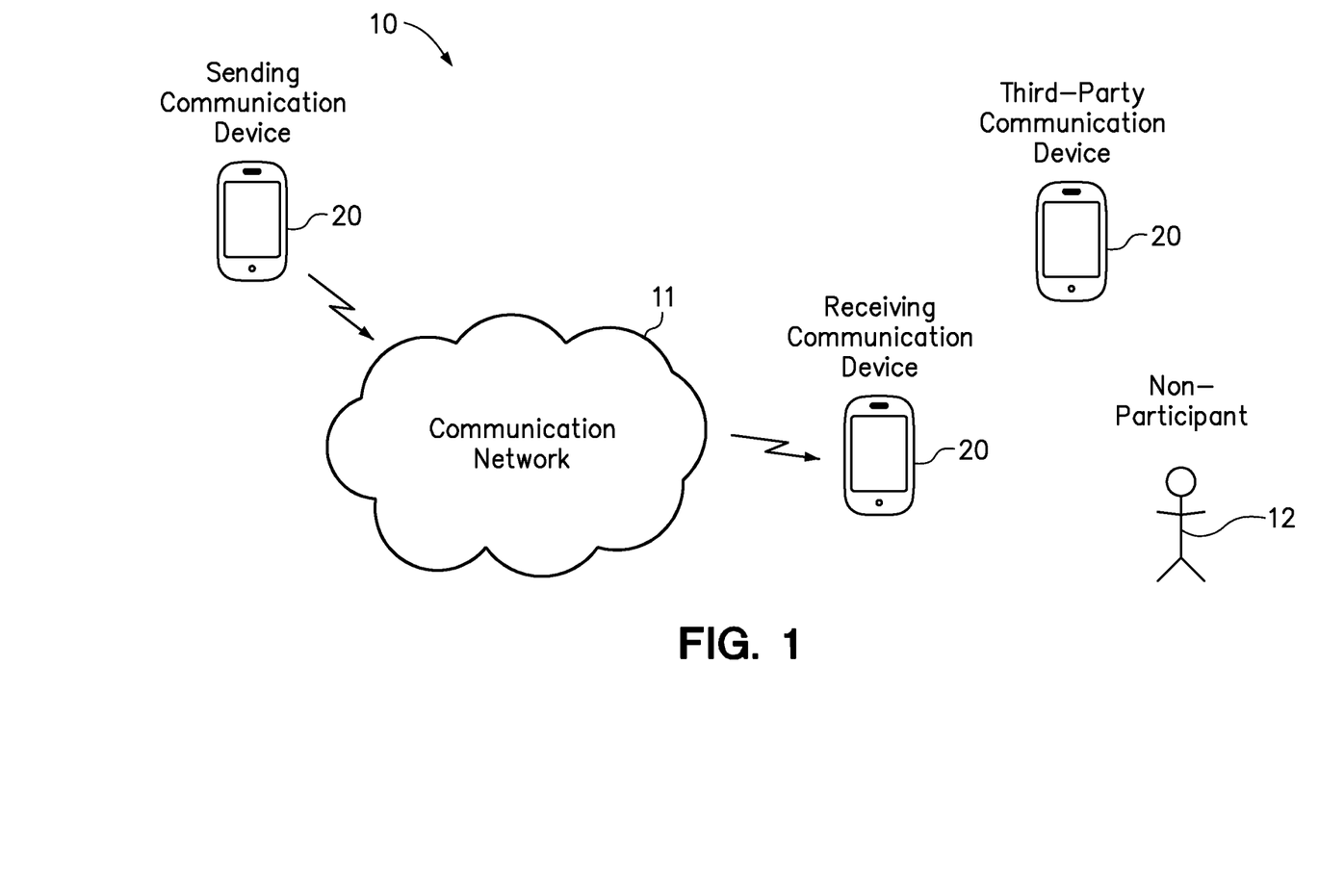
FIG. 1 is a diagram of a sending communication device and a receiving communication device in communication over a communication network.

FIG. 1 is a diagram of a system 10 including a sending communication device 20 and a receiving communication device 20 in communication over a communication network 11. The sending and receiving communication devices 20 may be identical. In the context of this disclosure, a sending communication device (initiator/source) is the communication device that designates the receiving communication device (responder/destination) that will also be involved in the communication. While the receiving communication device may also "send" data and information in accordance with the present invention, the receiving communication device does not designate the other communication device that is involved in the communication. As shown, there is one additional communication device 20 (a Third Party Communication Device) and a person 12 (Non-Participant) in the proximity of the receiving communication device 20. The presence of the Non-Participant 12 and the Third Party Communication Device 20 poses a potential security threat to the privacy of communications involving the receiving communication device 20.

Figure 2:
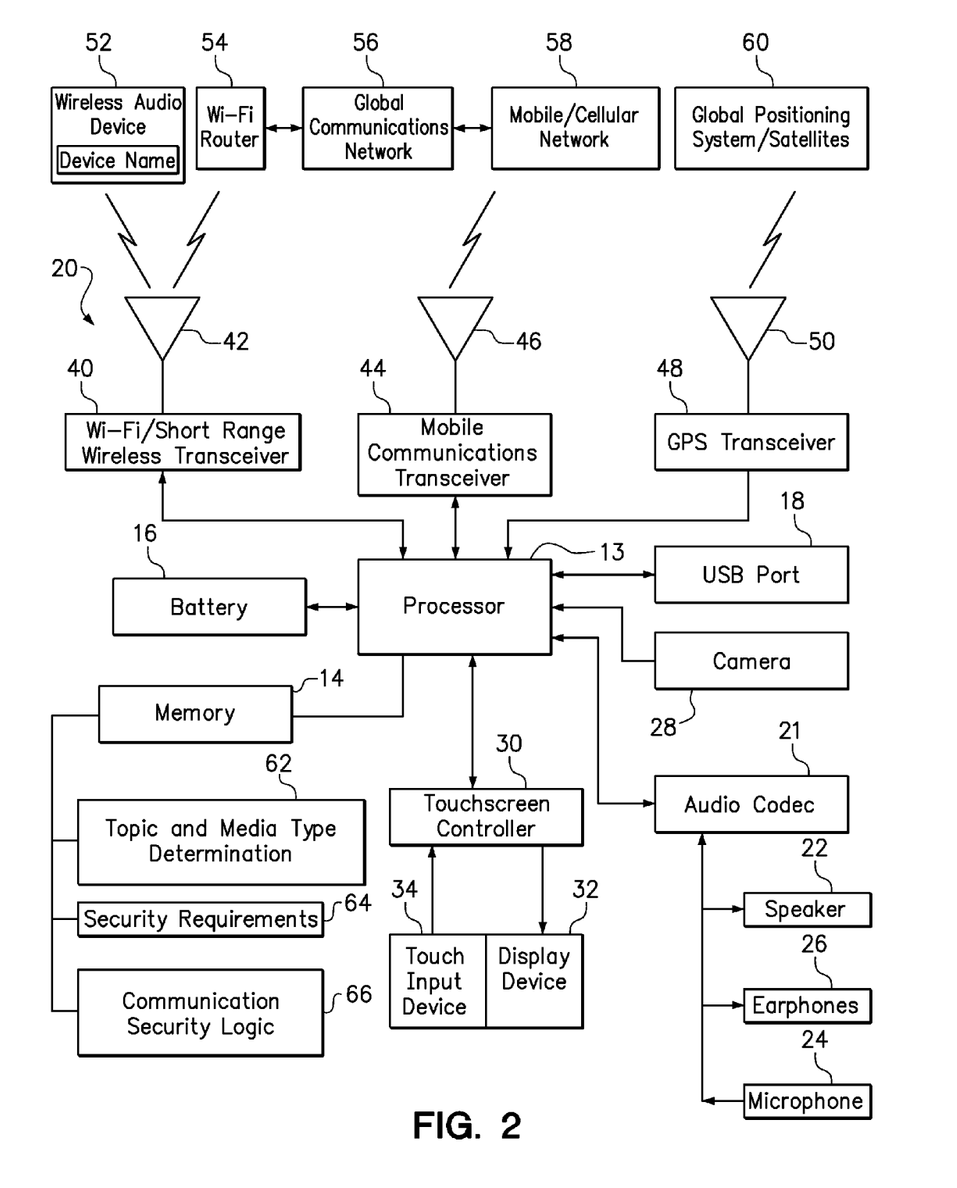
FIG. 2 is a diagram of a wireless mobile communication device consistent with either the sending communication device or the receiving communication device.

FIG. 2 is a diagram of the wireless mobile communication device 20, such as a smart phone, capable of implementing embodiments of the present invention. The wireless mobile communication device 20 may be representative of either the sending communication device or the receiving communication device.

The communication device 20 may include a processor 13, memory 14, a battery 16, a universal serial bus (USB) port 18, a camera 28, and an audio codec 21 coupled to a speaker 22, a microphone 24, and an earphone jack 26. The communication device 10 may further include a touchscreen controller 30 which provides a graphical output to the display device 32 and an input from a touch input device 34. Collectively, the display device 32 and touch input device 34 may be referred to as a touchscreen.

The communication device 20 may also include a Wi-Fi and/or Bluetooth transceiver 40 and corresponding antenna 42 allowing the device to communicate with a wireless (Bluetooth) audio device 52 or a Wi-Fi router 54, a mobile communication transceiver 44 and corresponding antenna 46 allowing the device to communicate over a mobile/cellular network 58, and a global positioning system (GPS) transceiver 48 and corresponding antenna 50 allowing the device to obtain signals from a global positioning system or satellites 60. In a non-limiting example, the Wi-Fi router 54 and the mobile/cellular network 58 may be connected to a global communications network 56, such as the Internet. As shown, the memory 14 stores a topic and media type determination module 62, a security requirements module 64, and a communication security logic module 66.

Figure 3:
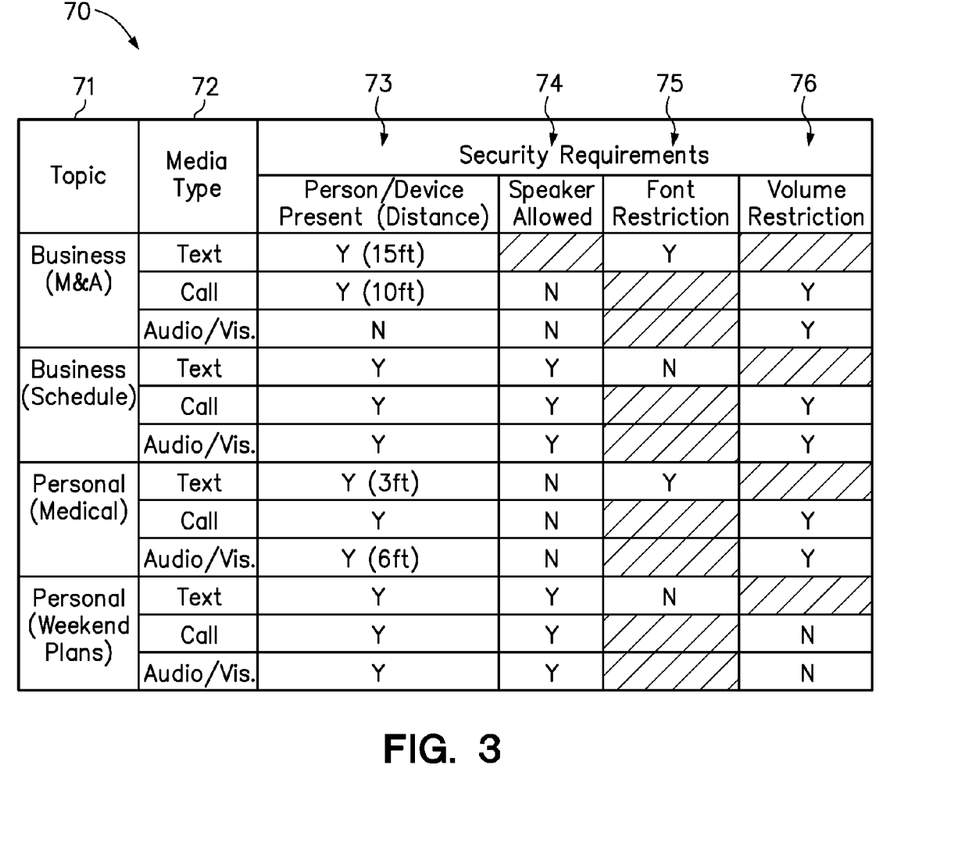
FIG. 3 is a table illustrating how the topic and media type of a communication may be associated with one or more security requirements.

FIG. 3 is a table 70 illustrating how the topic and media type of a communication may be associated with one or more security requirements. Such a table represents one non-limiting illustration of the security requirements module 64 of FIG. 2. Based on the determination of a topic and a media type, the table identifies a set of security requirements. In this illustration, there are four example topics including a business communication about a merger and acquisition (very highly confidential), a business communication about a user's work schedule (only marginally confidential), a personal communication about the user's medical issues (confidential), and a personal communication about a user's weekend plans (not confidential). In this illustration, there are three media types that may be used by the sending communication device to communicate with the receiving communication device. The security requirements differ according to the topic (column 71) as well as the media type (column 72). For any combination of topic and media type, the table 70 identifies or assigns one or more security requirements.

In the present illustration, a communication about mergers and acquisitions (M&A) sent via a text message would be assigned security requirements of only allowing a person or device to be present if their distance from the receiving communication device is 15 feet or greater, and if the font size in effect for the receiving communication device meets a font restriction. Alternatively, the same communication about mergers and acquisitions (M&A) sent via a call would be assigned security requirements of only allowing a person or device to be present if their distance from the receiving communication device is 10 feet or greater, if no speaker (i.e., open air speakerphone) is being used, and if the volume meets a volume restriction.

Figure 4:
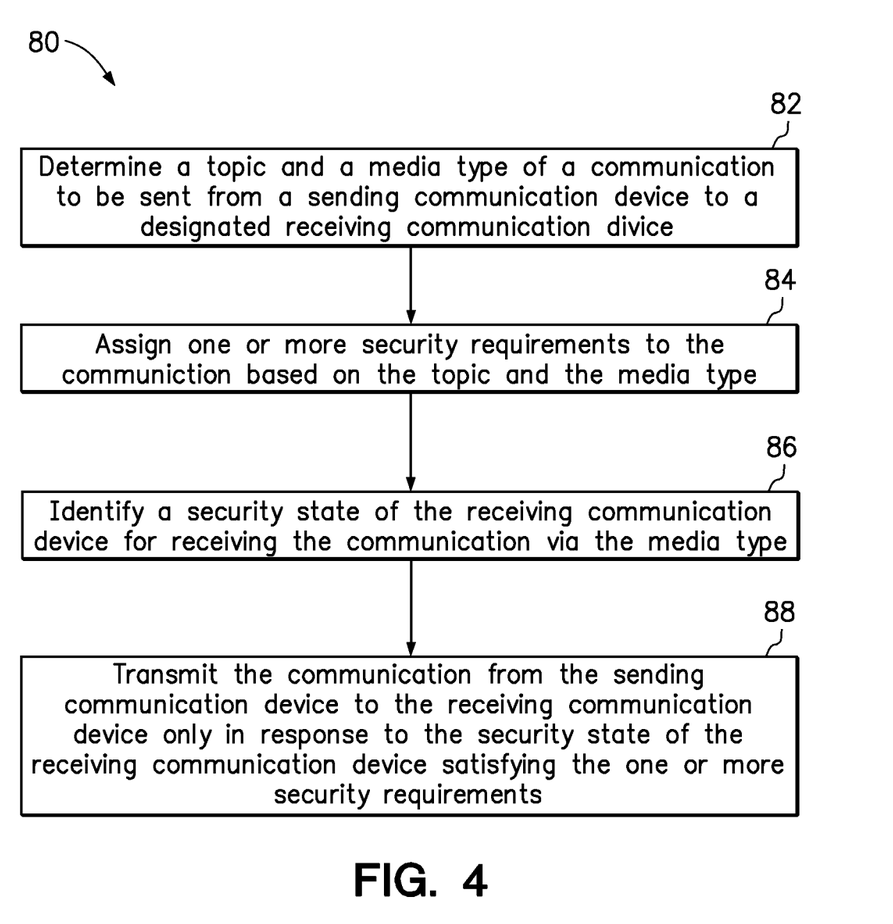
FIG. 4 is a flowchart of a method according to one embodiment of the present invention.

FIG. 4 is a flowchart of a method 80 according to one embodiment of the present invention. In step 82, the method determines a topic and a media type of a communication to be sent from a sending communication device to a designated receiving communication device. In step 84, the method assigns one or more security requirements to the communication based on the topic and the media type. In step 86, the method identifies a security state of the receiving communication device for receiving the communication via the media type. Then, in step 88, the method transmits the communication from the sending communication device to the receiving communication device only in response to the security state of the receiving communication device satisfying the one or more security requirements.

Figure 5:
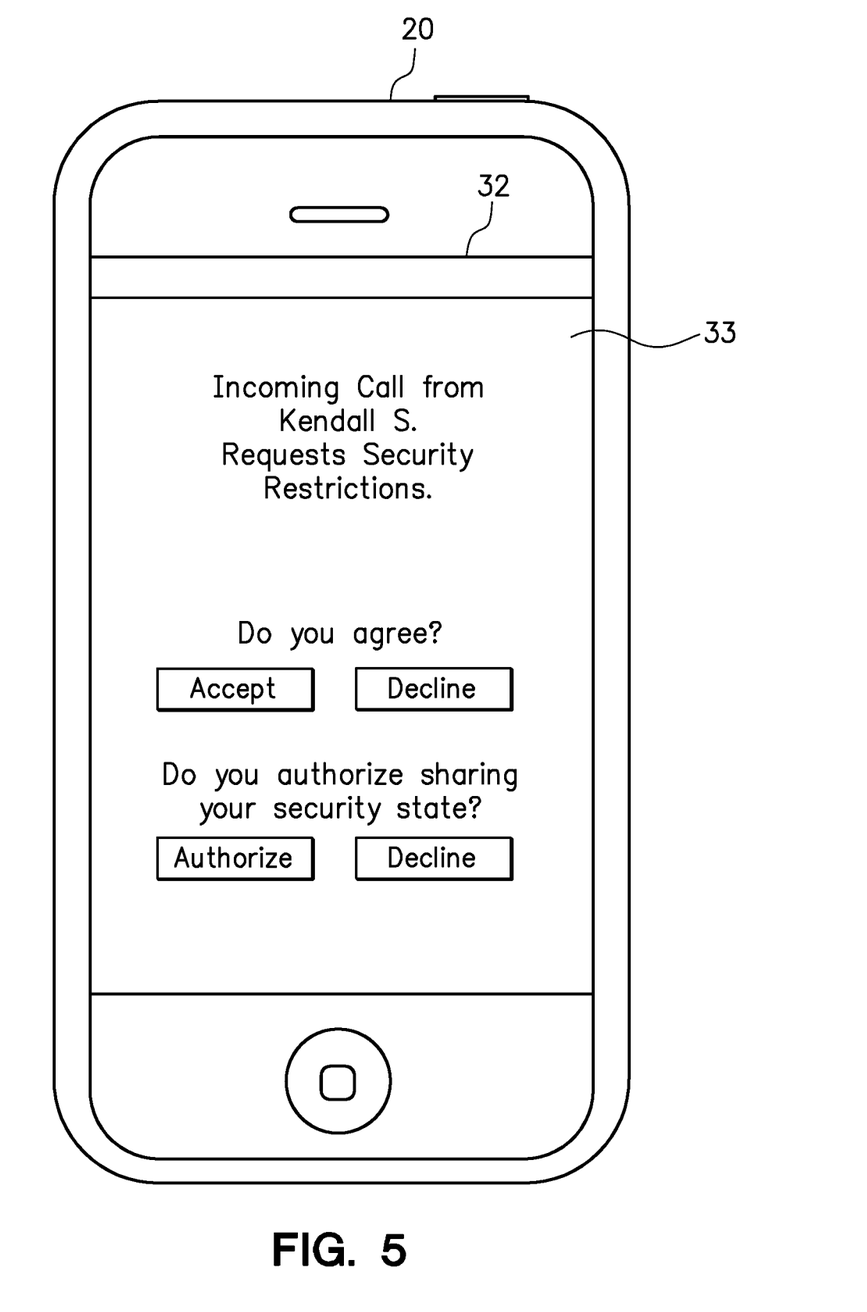
FIG. 5 is a diagram of a display screen of a wireless mobile communication device illustrating an on-screen notification requesting acceptance of security restrictions and authorization to share the security state of the device.

FIG. 5 is a diagram of a display screen 32 of a wireless mobile communication device 20 illustrating an on-screen notification 33, as might appear on the receiving communication device, requesting acceptance of security restrictions and authorization to share the security state of the device.

Figure 6:
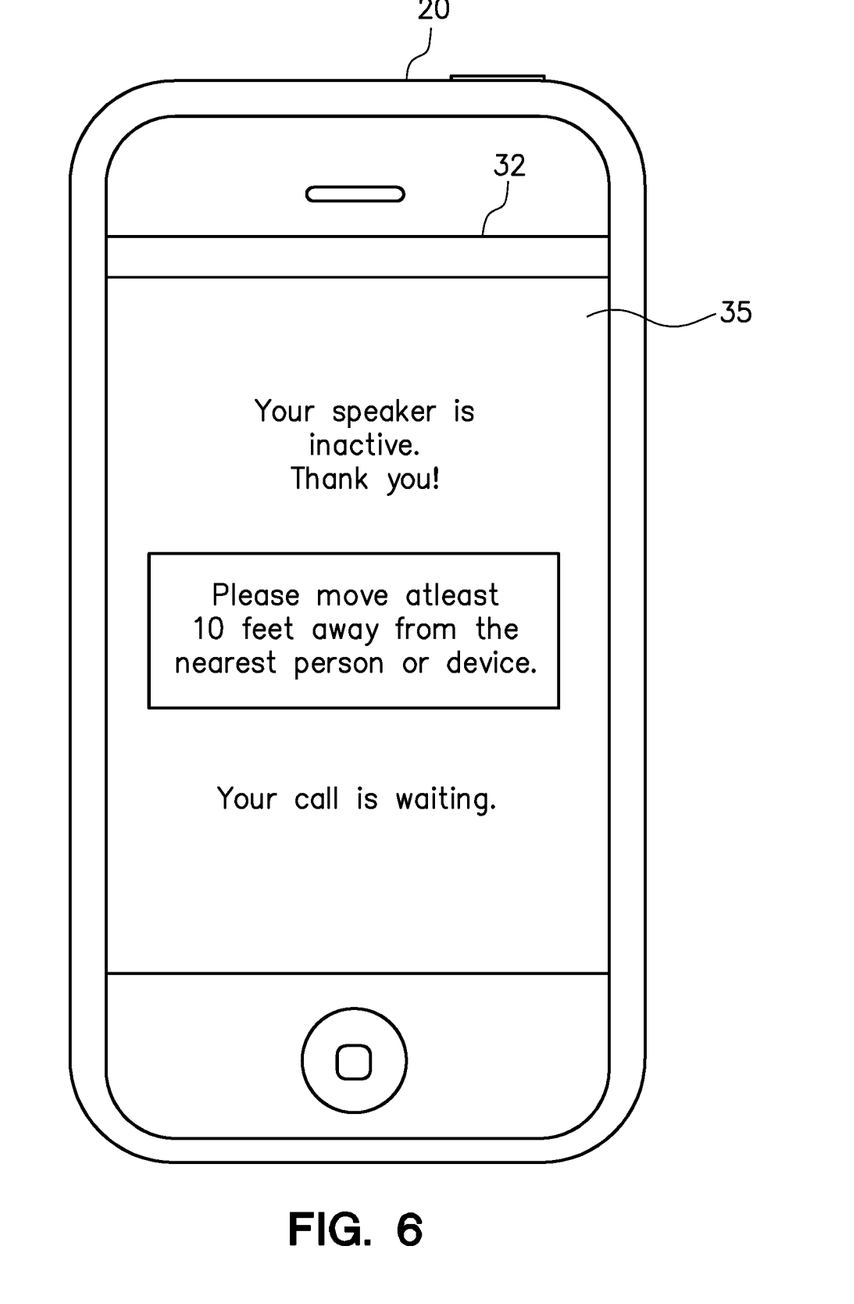
FIG. 6 is a diagram of a display screen of a wireless mobile communication device illustrating a notification that one security requirement has been satisfied and how to satisfy a second security requirement.

FIG. 6 is a diagram of a display screen 32 of a wireless mobile communication device 20 illustrating an on-screen notification 35 stating that one security requirement has been satisfied, describing how to satisfy a second security requirement, and reminding the user that their call is waiting.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   at least one storage device for storing program instructions; and
   at least one processor for processing the program instructions to:
   receive user entry of an electronic communication that designates a receiving communication device;
   determine a topic of the electronic communication;
   determine a media type of the electronic communication;
   assign one or more security requirements to the electronic communication based on the determined topic and the determined media type;
   identify a security state of the receiving communication device for receiving the electronic communication via the determined media type; and
   transmit the electronic communication to the receiving communication device over a communication network only in response to the security state of the receiving communication device satisfying the one or more security requirements assigned to the electronic communication.

2. The apparatus of claim 1, wherein the media type is selected from the group consisting of a voice message, a text message, and an audiovisual message.

3. The apparatus of claim 1, the at least one processor for further processing the program instructions to:
   identify a media type for which the identified security state of the receiving communication device will satisfy the one or more security requirements, wherein
   the electronic communication is transmitted to the receiving communication device using the identified media type.

4. The apparatus of claim 1, wherein the one or more security requirements assigned to the electronic communication include one or more manually entered security requirements.

5. The apparatus of claim 1, wherein the at least one processor for processing the program instructions to identify the security state of the receiving communication device includes the at least one processor for further processing the program instructions to receive security state data from the receiving communication device, wherein the security state data includes audiovisual output settings.

6. The apparatus of claim 5, wherein the audiovisual output settings are selected from the group consisting of audio volume, active audio output device, text font size, screen size, and combinations thereof.

7. The apparatus of claim 1, wherein the at least one processor for processing the program instructions to identify the security state of the receiving communication device includes the at least one processor for further processing the program instructions to receive one or more environmental conditions detected by the receiving communication device using an input device selected from the group consisting of a microphone, a camera, a near field communication antenna, and combinations thereof.

8. The apparatus of claim 7, the at least one processor for further processing the program instructions to:
   determine, using the detected one or more environmental conditions, a distance from the receiving communication device to a person or an electronic device that is not involved in the communication.

9. The apparatus of claim 8, the at least one processor for further processing the program instructions to:
   determine whether the distance from the receiving communication device to the person or electronic device is less than a predetermined distance threshold associated with the current audiovisual output settings of the receiving communication device, wherein the audiovisual output settings are selected from the group consisting of audio volume, active audio output device, text font size, screen size, and combinations thereof.

10. The apparatus of claim 1, the at least one processor for further processing the program instructions to:
    request that the receiving communication device accept the one or more security requirements specified by the second communication device; and
    send the one or more security requirements to the receiving communication device for implementation by the receiving communication device.

11. The apparatus of claim 1, the at least one processor for further processing the program instructions to:
    request that the receiving communication device share security state data; and
    send the communication only in response to the security state data of the receiving communication device satisfying the one or more security requirements.

12. The apparatus of claim 11, the at least one processor for further processing the program instructions to:
    periodically request that the receiving communication device send updated security state data.

13. The apparatus of claim 12, wherein the the security state data includes audiovisual output settings selected from the group consisting of call volume, text font size, a security screen installed, a headpiece in use, a speakerphone in use, and combinations thereof.

14. The apparatus of claim 1, the at least one processor for further processing the program instructions to:
    delay transmission of the electronic communication until the receiving communication device has satisfied the one or more security requirements.

15. The apparatus of claim 1, at least one processor for further processing the program instructions to:
    convert the electronic communication from a media type for which the receiving communication does not satisfy the one or more security requirements to a media type for which the receiving communication device satisfies the one or more security requirements.

16. The apparatus of claim 1, the at least one processor for further processing the program instructions to:
produce an output notification to the receiving communication device describing a security requirement that has not been satisfied or describing how to satisfy a security requirement that has not been satisfied.

17. An apparatus, comprising:
at least one storage device for storing program instructions; and
at least one processor for processing the program instructions to:
receive user entry of an electronic communication that designates a receiving communication device;
determine a topic of the electronic communication;
determine a media type of the electronic communication;
search predetermined associations of various topics and various media types with various security requirements;
automatically assign one or more security requirements to the electronic communication, the one or more security requirements having a predetermined association with the determined topic and the determined media type of the electronic communication;
identify a security state of the receiving communication device for receiving the electronic communication via the determined media type; and
transmit the electronic communication to the receiving communication device over a communication network only in response to the security state of the receiving communication device satisfying the one or more security requirements assigned to the electronic communication.

18. The apparatus of claim 17, wherein the predetermined associations include a history of manually entered associations between the various topics and the various security requirements.

19. The apparatus of claim 17, the at least one processor for further processing the program instructions to:
monitor a sequence of messages within the communication;
determine the topic of each message; and
assign one or more new security requirements in response to a change in the topic of the communication.

20. An apparatus, comprising:
at least one storage device for storing program instructions; and
at least one processor for processing the program instructions to:
receive user entry of an electronic communication that designates a receiving communication device;
determine a topic of the electronic communication;
determine a media type of the electronic communication;
assign one or more security requirements to the electronic communication based on the topic and the media type;
identify a security state of the receiving communication device for receiving the electronic communication via the media type; and
produce an output notification in response to determining that the receiving communication device has not satisfied each of the one or more security requirements.

* * * * *